(12) United States Patent
Mishra et al.

(10) Patent No.: US 10,318,873 B2
(45) Date of Patent: Jun. 11, 2019

(54) SYSTEM AND METHOD FOR DETERMINING AN EXPERT OF A SUBJECT ON A WEB-BASED PLATFORM

(71) Applicant: Tata Consultancy Services Limited, Maharashtra (IN)

(72) Inventors: Pratik Kumar Mishra, Chennai (IN); Dinesh Pothineni, Chennai (IN); Aadil Rasheed, Chennai (IN); Deepak Sundararajan, Chennai (IN); Ashok Krish, Chennai (IN); Hasit Kaji, Chennai (IN)

(73) Assignee: TATA CONSULTANCY SERVICES LIMITED (IN)

(*) Notice: Subject to any disclaimer, the term of this patent is extended or adjusted under 35 U.S.C. 154(b) by 611 days.

(21) Appl. No.: 14/220,262

(22) Filed: Mar. 20, 2014

(65) Prior Publication Data
US 2014/0289175 A1    Sep. 25, 2014

(30) Foreign Application Priority Data
Mar. 22, 2013  (IN) .......................... 1023/MUM/2013

(51) Int. Cl.
*G06F 15/18*    (2006.01)
*G06N 5/04*    (2006.01)

(52) U.S. Cl.
CPC ...................... *G06N 5/04* (2013.01)

(58) Field of Classification Search
CPC ...... G06N 99/005; G06N 5/025; G06N 7/005; G06N 5/04; G06K 9/6256; G06K 9/6269
See application file for complete search history.

(56) References Cited

U.S. PATENT DOCUMENTS 6,921,268 B2 * 7/2005 Bruno .................... G09B 7/06
                                                    434/323
8,478,735 B1    7/2013 Archambault et al.
(Continued)

OTHER PUBLICATIONS

Ching-Yung Lin, Nan Cao, Shi Xia Liu, Spiros Papadimitriou, Jimeng Sun, Xifeng Yan, "SmallBlue: Social Network Analysis for Expertise Search and Collective Intelligence", #IBM T.J. Watson Research Center 19 Skyline Dr, Hawthorne, NY, USA 2005.
(Continued)

*Primary Examiner* — Scott A. Waldron
*Assistant Examiner* — Ababacar Seck
(74) *Attorney, Agent, or Firm* — Hayes Soloway P.C.

(57) ABSTRACT

Disclosed is a system for determining an expert of one or more subjects on a web-based platform. The system comprises a mining module for mining activity data of at least one user of a plurality of users from the web-based platform. The mining module may further compare the activity data with one or more subjects. The mining module may further label the activity data to a subject of the one or more subjects. A scoring module may assign performance points to the at least one user associated to the activity data. The scoring module may further assign subject points to the subject. The scoring module may further generate an activity gauge for the at least one user based on the performance points assigned and the subject points. The scoring module may further classify the at least one user as the expert of the subject.

12 Claims, 5 Drawing Sheets

(56) References Cited

U.S. PATENT DOCUMENTS

| | | | | |
|---|---|---|---|---|
| 8,731,454 B2* | 5/2014 | Dohring | ............... | G09B 5/00 |
| | | | | 434/350 |
| 2004/0219493 A1* | 11/2004 | Phillips | ............... | G09B 5/06 |
| | | | | 434/118 |
| 2007/0198510 A1* | 8/2007 | Ebanks | ............... | G06Q 30/02 |
| 2010/0262610 A1 | 10/2010 | Acosta et al. | | |
| 2012/0185544 A1* | 7/2012 | Chang | ............... | G06Q 50/01 |
| | | | | 709/206 |
| 2012/0226748 A1 | 9/2012 | Bosworth et al. | | |
| 2012/0254095 A1* | 10/2012 | Flinn | ............... | G06N 7/02 |
| | | | | 706/52 |
| 2013/0330704 A1* | 12/2013 | Creamer | ............... | G09B 7/00 |
| | | | | 434/362 |
| 2014/0101085 A1* | 4/2014 | Lu | ............... | G06N 5/02 |
| | | | | 706/46 |
| 2014/0181088 A1* | 6/2014 | Schwob | ............... | G06F 17/30554 |
| | | | | 707/722 |

OTHER PUBLICATIONS

Christopher S. Campbell Paul P. Maglio Alex Cozzi Byron Dom, "Expertise Identification using Email Communications", IBM Almaden Research Center 2003.

* cited by examiner

SYSTEM AND METHOD FOR DETERMINING AN EXPERT OF A SUBJECT ON A WEB-BASED PLATFORM

CROSS REFERENCE TO RELATED APPLICATION

This application claims the benefit of Indian Patent Application No. 1023/MUM/2013, filed Mar. 22, 2013, the entire disclosure of which is incorporated herein by reference.

TECHNICAL FIELD

The present subject matter described herein, in general, relates to web-based platform, and more particularly to determine an expert based on performance points assigned to users of the web-based platform.

BACKGROUND

In an era of social media, social platform like (Facebook®, Twitter®, LinkedIn®, Orkut®) provide a virtual platform for online users to perform various activities such as blogging, instant messaging, posting messages and the like. Further such social platform may facilitate the users across geographical region to share their thoughts on the virtual platform. For example, consider a user $U_1$ may express his desire to buy a car on the social platform. Further the user $U_1$ may seek advice from other users of the social network regarding the same. In response, the other users may provide their comments and/or suggestions to the user $U_1$ in order to assist the user $U_1$ in taking his decision to buy the car. Similarly, the users may perform several activities on the platform to express their needs, desires, knowledge, skills, capability, feelings, and the like.

In view of the above, such users may neither be identified nor awarded for their skill, despite of conveying their skill on the social platform.

SUMMARY

Before the present systems and methods, are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application. This summary is provided to introduce concepts related to systems and methods for determining an expert and the concepts are further described below in the detailed description. This summary is not intended to identify essential features of the claimed subject matter nor is it intended for use in determining or limiting the scope of the claimed subject matter.

In one implementation, a system for determining an expert of one or more subjects on a web-based platform is disclosed. The web-based platform may be at least one of an e-learning management platform, a human resource management platform, a social platform. In one aspect, the system may comprise a processor and a memory coupled to the processor for executing a plurality of modules present in the memory. The plurality of modules may comprise a mining module and a scoring module. In one aspect, in order to determine the expert of the one or more subject, initially, the mining module may mine activity data of at least one user of a plurality of users from the web-based platform. The activity data may comprise at least one of blog, comment, answer, question, status update, or a combination thereof. After mining the activity data, the mining module may further compare the activity data with one or more subjects based upon one or more techniques. The one or more techniques may be a text comparison technique. Based upon the comparison of the activity data with the one or more subjects, the mining module may further label the activity data to a subject of the one or more subjects. Subsequent to the labeling of the activity data to the subject, the scoring module may assign performance points to the at least one user associated to the activity data labeled to the subject. In one aspect, the performance points may be assigned based upon feedback of at least one other user of the plurality of users and one or more parameters associated to the activity data corresponding to the feedback. The one or more parameters may comprise a distance, a speed, a frequency, and a quality. In one embodiment, the scoring module may further assign subject points to the subject based on the performance points assigned to the at least one user in the subject. The subject points of the subject may indicate aggregation of the performance points assigned to each user of the at least one user. Based upon the assignment of the performance points and the subject points, the scoring module may further generate an activity gauge for the at least one user. In one aspect, the activity gauge may indicate a level of expertise of the at least one user in the subject. In one aspect, the level of expertise is low when the performance points are less than a first threshold value. In another aspect, the level of expertise is high when the performance points are greater than a second threshold value. In yet another aspect, the level of expertise is medium when the performance points are in between the first threshold value and the second threshold value. Based on the generation of the activity gauge, the scoring module may further classify the at least one user as the expert of the subject.

In another implementation, a method for determining an expert of one or more subjects on a web-based platform is disclosed. In one aspect, in order to determine the expert, initially, activity data of at least one user of a plurality of users may be mined from the web-based platform. Subsequent to the mining of the activity data, the activity data may be compared with one or more subjects based upon one or more techniques. Based upon the comparison, the activity data may be labeled to a subject of the one or more subjects. Subsequent to the labeling of the activity data to the subject, performance points may be assigned to the at least one user associated to the activity data labeled to the subject. In one aspect, the performance points may be assigned based upon feedback of at least one other user of the plurality of users and one or more parameters associated to the activity data. Subsequent to the assignment of the performance points, subject points may be assigned to the subject based on the performance points assigned to the at least one user in the subject. The subject points of the subject may indicate aggregation of the performance points assigned to each user of the at least one user. Based upon the assignment of the performance points and the subject points, an activity gauge for the at least one user may be generated. The activity gauge may indicate a level of expertise of the at least one user in the subject. Based on the activity gauge, the at least one user may be classified as the expert of the subject.

In yet another implementation, a non transitory computer program product having embodied thereon a computer program for determining an expert of one or more subjects on a web-based platform is disclosed. The computer program product may comprise instructions for mining activity data of at least one user of a plurality of users from the web-based platform. The computer program product may comprise instructions for comparing the activity data with one or more subjects based upon one or more techniques. The computer program product may comprise instructions for labeling the activity data to a subject of the one or more subjects based upon the comparison. The computer program product may comprise instructions for assigning performance points to the at least one user associated to the activity data labeled to the subject. In one aspect, the performance points may be assigned based upon feedback of at least one other user of the plurality of users and one or more parameters associated to the activity data. The computer program product may comprise instructions for assigning subject points to the subject based on the performance points assigned to the at least one user in the subject. In one aspect, the subject points of the subject indicates aggregation of the performance points assigned to each user of the at least one user. The computer program product may comprise instructions for generating an activity gauge for the at least one user based on the performance points and the subject points. In one aspect, the activity gauge indicates a level of expertise of the at least one user in the subject. The computer program product may comprise instructions for classifying the at least one user as the expert of the subject based on the activity gauge.

BRIEF DESCRIPTION OF THE DRAWINGS

The foregoing detailed description of embodiments is better understood when read in conjunction with the appended drawings. For the purpose of illustrating the disclosure, there is shown in the present document example constructions of the disclosure; however, the disclosure is not limited to the specific methods and apparatus disclosed in the document and the drawings.

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing Of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The present subject matter provides systems and methods for determining an expert of one or more subjects on a web-based platform. Examples of the web-based platform may include, but limited to, an e-learning management platform, a human resource management platform, a social platform such as Facebook®, Twitter®, LinkedIn®, Orkut® and the like. Examples of the one or more subjects may include, but not limited to, Mechanical, Electrical, Electronics and telecommunication, Computers, Information Technology, and Civil, mobile phones, home appliances, fashion, Light Emitting Diode (LED) Televisions, and the like. The expert may be person having proficiency in a particular subject. It may be understood that at least one user of a plurality of users may perform several activities on the web-based platform. Examples of activities may include instant messaging, posting messages, posting a blog, comment, feelings, expression, and the like. Further, as and when the at least one user may perform any activity, comprising activity data, on the web-based platform, the activity data may be compared with one or more subjects.

It may be understood that, the one or more subjects are pre-defined in a database. In one example, the activity data may be labeled with the subject by comparing a content of the activity data with the one or more subjects. After labeling the activity data with the subject, the at least one user may be assigned with base points and performance points. In one embodiment, the base points may be assigned to the at least one user for mere involvement of the at least one user on the web-based platform. In one aspect, the base points may be represented on a scale that indicates a measure of activities being performed by the at least one user over a pre-defined time interval. The scale may motivate the plurality of users to participate actively on the web-based platform in order to collaboratively enhance knowledge of one another.

The performance points, on the other hand, may be assigned based on reception of the activity data associated to the at least one user. It may be understood that, the performance points may be awarded to the at least one user based on feedback of at least one other user of the plurality of users on the activity data. In one aspect, the feedback may be received from the at least one other user in the form of likes, comments, share, follow, and favorite. Subsequent to the feedback, the performance points may be assigned based upon one or more parameters associated to the activity data. Example of the one or more parameters may include, but not limited to, a distance, a speed, a frequency, and a quality. After assigning the performance points, the subject may also be assigned with subject points based on the performance points assigned to each user of the plurality users in the subject.

For example, consider that a user $U_1$ publish a post $P_1$ on Facebook®. The post P1 will be related to a subject $S_1$. Based on the aforesaid description, the user $U_1$ may be assigned with performance points based on the feedback of the at least one other user on the post $P_1$ hereinafter referred as, a User $U_2$, a User $U_3$, a User $U_n$. In one aspect, the feedback may indicate reputation and knowledge of the user $U_1$ in the subject $S_1$. Similarly, consider that the User $U_2$, the User $U_3$, the User $U_n$ may also publish a post $P_1$, a post $P_2$, and a post $P_n$ respectively on Facebook®, wherein the post $P_1$, the post $P_2$, and the post $P_n$ is associated to the subject $S_1$. Then, it may be understood that, the User $U_2$, the User $U_3$, the User $U_n$ may also be entitled for the performance points based on the feedback of the at least one other user on the post $P_1$, the post $P_2$, and the post $P_n$ respectively. In one aspect, the feedback on the post $P_1$ may be received from at least one of the User $U_2$ or the User $U_3$ or the User $U_n$. Similarly the feedback on the post $P_2$ may be received from at least one of the User $U_1$ or the User $U_3$ or the User $U_n$.

In one embodiment, after assigning the performance points to the User $U_2$, the User $U_3$, the User $U_n$, subject points may also be assigned to the subject $S_1$. The subject points may be assigned based on aggregation of the performance points assigned to the User $U_1$, the User $U_2$, the User $U_3$ and the User $U_n$ corresponding to the subject $S_1$. For example, the subject points of the subject $S_1$ may be determined by:

$$\text{Subject points}_{(S1)} = \Sigma(\text{User } U_{1 \text{ (performance points in } S1)},$$
$$\text{User } U_{2 \text{ (performance points in } S1)},$$
$$\text{User } U_{3 \text{ (performance points in } S1)},$$
$$\text{User } U_{n \text{ (performance points in } S1)}).$$

Based on the assignment of the performance points and the subject points, an activity gauge may be generated. The activity gauge may indicate level of expertise of the user U1 in the subject $S_1$. It may be understood that different users, performing different activities pertaining to the subject $S_1$, may be assigned with different performance points. For example, consider that the user $U_1$, the user $U_2$, the user $U_3$ and the user $U_n$ assigned with 10, 40, 30 and 35 performance points respectively in the subject S1. Thus, based on the performance points, the activity gauge classifies the plurality of the users. For example, the user $U_2$, the user $U_4$, the user $U_3$ and the user $U_1$ are classified in different levels of expertise based on the performance points assigned in the subject $S_1$. Therefore, based upon the different levels of expertise, an expert of the subject may be determined.

While aspects of described system and method determining an expert of one or more subjects and may be implemented in any number of different computing systems, environments, and/or configurations, the embodiments are described in the context of the following exemplary system.

Figure 1:
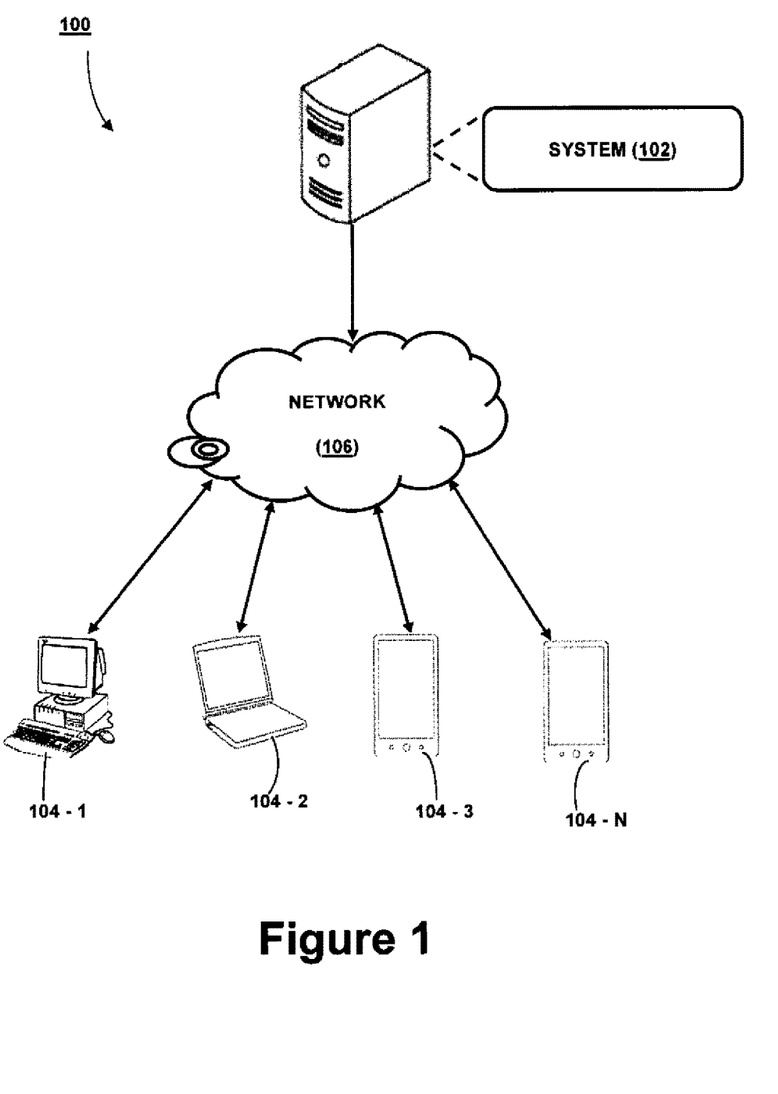
FIG. 1 illustrates a network implementation of a system for determining an expert of one or more subjects on a web-based platform, in accordance with an embodiment of the present subject matter.

Referring now to FIG. 1, a network implementation 100 of a system 102 for determining an expert of one or more subjects on a web-based platform is illustrated, in accordance with an embodiment of the present subject matter. In one embodiment, the system 102 may be configured to mine activity data of at least one user of a plurality of users from the web-based platform. After mining the activity data, the system 102 may further be configured to compare the activity data with the one or more subjects. Based upon comparing the activity data, the system 102 may further be configured to label the activity data to a subject of the one or more subjects. Subsequent to the labeling of the activity data with the subject, the system 102 may further be configured to assign performance points to the at least one user associated to the activity data labeled to the subject. In one aspect, the system 102 may further be configured to assign subject points to the subject based on the performance points assigned to the at least one user in the subject. Subsequent to the assignment of the performance points and the subject points, the system 102 may further be configured to generate an activity gauge for the at least one user. After generating the activity gauge, the system 102 may further be configured to classify the at least one user as the expert of the subject.

Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, a cloud-based computing environment and the like. In one implementation, the system 102 may comprise the cloud-based computing environment in which the user may operate individual computing systems configured to execute remotely located applications. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
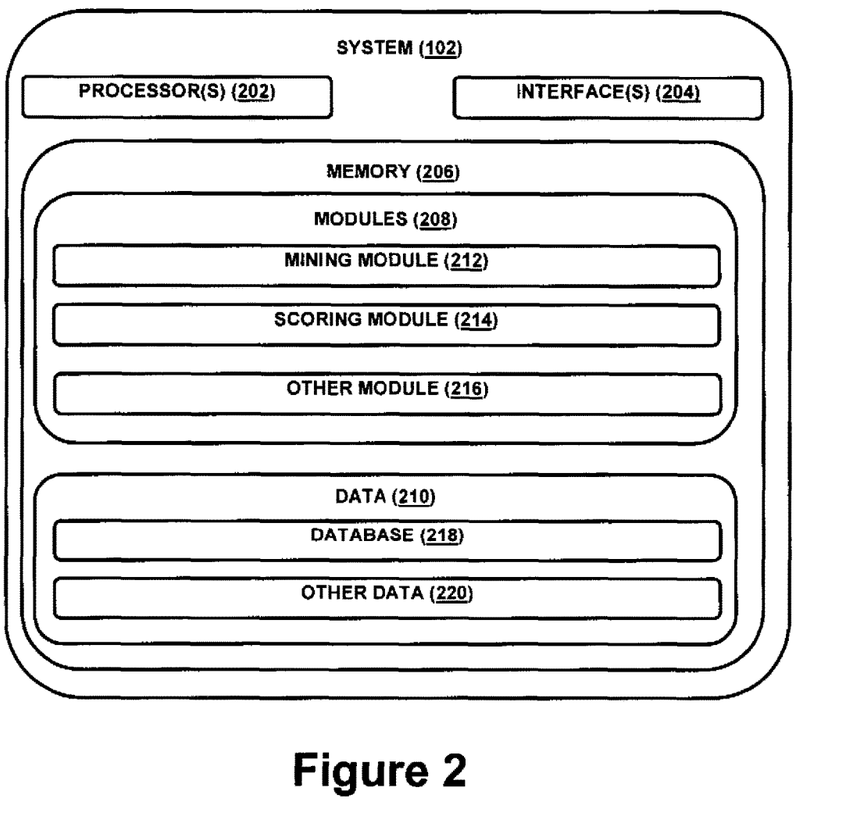
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a mining module 212, a scoring module 214 and other modules 216. The other modules 216 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a database 218 and other data 220. The other data 220 may include data generated as a result of the execution of one or more modules in the other module 216.

In one implementation, at first, a user may use the client device 104 to access the system 102 via the I/O interface 204. The user may register themselves using the I/O interface 204 in order to use the system 102. In one aspect, the user may accesses the I/O interface 204 of the web-based platform to perform an activity in the form of a post or a comment. In one aspect, the activity may comprise activity data that may be associated to one or more subjects. In order to determine an expert of the one or more subjects based on the activity of the at least one user, the system 102 may employ the mining module 212 and the scoring module 214.

Mining Module 212

Referring to FIG. 2, at first, the mining module may mine activity data of the at least one user of a plurality of users from a web-based platform. The web-based platform may be at least one of an e-learning management platform, a human resource management platform, a social platform such as Facebook®, Twitter®, LinkedIn®, Orkut® or the like. It may be understood, the web-based platform may either be a closed platform or an open platform. The closed platform may be used only by an organization or a community within themselves, whereas the open platform may be used by anyone on the Internet. It may be understood that the at least one user may perform several activities on the web-based platform by using the client device 104. Examples of activities may include sharing knowledge, instant messaging, posting messages, posting a blog, commenting expressions, expressing feelings, and the like.

In order to mine the activity data from the web-based platform, the mining module 212 may mine the activity data from the web-based platform. In one aspect, the activity data may be mined by using various data mining techniques. The data mining techniques may be performed by executing a set of tasks. The set of tasks may include anomaly detection, association rule learning, clustering, classification, regression and summarization. Examples of the data mining techniques may include, but not limited to, Carrot2, Chemicalize, ELKI, GATE, SCaViS, KNIME, ML-Flex, NLTK (Natural Language Toolkit), SenticNet API, RapidMiner, UIMA (Unstructured Information Management Architecture), Angoss KnowledgeSTUDIO, KXEN Modeler, Predixion Insight.

Now, in order to understand a working of the mining module 212, consider a following example. In this example, the at least one user may perform one or more activities on the web-based platform. The at least one user may perform one or more activities comprising the activity data. The activity data associated may look like the following:

Example (1):
User $U_1$: "Which phone should I buy (Android®, Windows® or IOs®)?"
User $U_2$: "You must go for Samsung®. It is a great phone to go with. And undoubtedly android is the current market holder so go for it. You may have a look at its specifications"
User $U_3$: "I will suggest you to buy Apple® that has IOs® operating system. It comes with Lastest NFC technology. Other Samsung do not support NFC technology"
User $U_4$: "Don't take Window phone such as Nokia Lumia®. Buy any android phone like Micromax®, Karbonn®, or the Samsung®."

As the above posts are posted on the web-based platform, the mining module 212 may mine the activity data of the at least one user by using the data mining techniques as aforementioned.

Subsequent to the mining of the activity data from the web-based platform, the mining module 212 may compare the activity data with the one or more subjects. It may be understood that the one or more subjects may be defined in the database 218. Examples of the one or more subjects as defined in the database 218 may include, but not limited to, Mechanical, Electrical, Electronics and telecommunication, Computers, Information Technology, and Civil, mobile phones, home appliances, fashion, Light Emitting Diode (LED) Televisions, Artificial Intelligence and the like. In one aspect, the mining module 212 may compare the activity data with the one or more subjects by using one or more techniques. In one example, one technique of the one or more techniques may include a text comparison technique. The text comparison technique may compare each word of the activity data with the one or more subjects. In addition to the text comparison technique, there may some other techniques that may facilitate to compare the activity data with the one or more subjects. Based on the comparison, the mining module 212 may label the activity data to a subject of the one or more subjects.

In order to understand the labeling of the activity data to the subject of the one or more subjects, let us consider the same example same as aforementioned. In the example (1), the mining module, after mining the activity data, may compare the activity data of the at least one user with the each subject as defined in the database 218 by using the text comparison technique. Based on the comparison, it is determined that, that the activity data is associated to the subject i.e. "Mobile Phones." Based on the determination of the subject, the mining module 212 may further labels/tags the activity data of the at least one user (i.e. the User $U_1$, the User $U_2$, the User U3, and the User U4) with the subject (i.e. "Mobile Phones"). In one aspect, the labeling of the activity data may indicate that the activity data is contextually related to the subject.

Scoring Module 214

Based upon the labeling of the activity data with the subject, the scoring module 214 may assign base points and performance points to the at least one user associated to the activity data. It may be understood that, the base points assigned to the at least one user may be of two types, namely, an author and a receptor. For the purpose of present subject matter, the author may be understood as a person to start an activity such as, writing a blog about a particular subject, whereas the receptor may be the ones commenting or clarifying on the activity of the author. The at least one user, whether the author or the receptor, may be assigned with the base points by the scoring module 214.

Now, in order to understand a working of the scoring module 214, consider an example, a plurality of users may perform one or more activities on the web-based platform. The plurality of users may be User $U_1$, User $U_2$, User $U_3$, and User $U_4$. The one or more activities of the User $U_1$, the User $U_2$, the User $U_3$, and the User $U_4$ may look like the following:

Example (2):

User $U_1$: "Which phone should I buy (Android®, Windows® or IOs®)?"

User $U_2$: "You must go for android based phone such as Samsung®. It is a great phone to go with. And undoubtedly android is the current market holder so go for it. You may have a look at its specifications"

User $U_3$: "I will suggest you to buy Apple® that has IOs® operating system. It comes with Lastest NFC technology. Other Samsung® do not support NFC technology"

User $U_4$: "Don't take Window phone such as Nokia Lumia®. Buy any android phone like Micromax®, Karbonn®, or the Samsung®."

User $U_2$: "Specifications of Samsung® Galaxy are: —Screen Size: 4.5 inches large, Resolution: 480*854 pixels, Processor/CPU: Quad Core 1.2 GHz, RAM: 1 GB, Phonebook Memory: Unlimited, SMS Memory: Unlimited"

User $U_2$: "Samsung® Galaxy further have Internal Memory: 4 GB+External Memory Slot, Battery Talktime: 16.00 hrs, Battery Standby: 230 hrs, Battery Capacity: 2000 mAh"

User $U_4$: "I am totally agree with User U2, as Samsung® Galaxy has some additional features like Smart Stay, Smart Pause which is still not present in the any other Windows® or IOs® phone"

Since the User $U_1$ started the activity, on the web-based platform, the User $U_1$ may be considered as an author of blog. Apart from the User$_1$, the User $U_2$, the User $U_3$, and the User $U_4$ may be considered as receptors as they commented or clarified on the activity of the author. Based on respective activities of the User $U_1$, the User $U_2$, the User $U_3$, and the User $U_4$, the scoring module 214 may assign the base points to the User $U_1$, the User $U_2$, the User $U_3$, and the User $U_4$.

In one aspect, the base points may be assigned to the at least one user by the scoring module 214 for mere involvement in a discussion on the subject over the web-based platform. Further, the base points may vary based upon a plurality of parameters such as complexity, importance, and a type of the activity being performed by the at least one user. In order to understand the basis of assigning the base points to the at least one user, consider the same example as aforementioned.

In the example (2), it may be understood that the User $U_1$ may be assigned 5 base points for being the author of blog, whereas the User $U_2$, the User $U_3$ and the User $U_4$ may be assigned 20, 10 and 10 base points respectively for being the receptor. In one aspect, the User $U_2$ may be assigned additional 10 points than the User $U_3$ and the User $U_4$ because the User $U_2$ briefly clarified on a query posted by the User $U_1$. Since, the User $U_2$ has performed more number of activities than any other user (i.e. the User $U_1$, User $U_3$ and the User $U_4$) and further clarifies on the query by detailing out the technical features of the "Samsung" phone that may assist the User $U_1$ to come up with a decision for buying the phone, therefore the User $U_2$ is assigned additional '10 points' then the User $U_1$, the User $U_3$ and the User $U_4$.

In one embodiment, the base points assigned to the at least one user may be represented on a scale, wherein the scale indicates a measure of activities being performed by the at least one user (the author or the receptor) over a pre-defined time interval. The scale indicates a contrast of the measure of activities being performed by the at least one user over the pre-defined time interval and a reference measure of activities that has been performed by the at least one user in the past. It may be understood that, the scale motivates the at least one user to participate actively on the web-based platform in order to collaboratively enhance knowledge of one another.

The performance points, on the other hand, may be assigned to the at least one user by the scoring module 214 based upon a performance of the at least one user involved in a discussion over the subject. It may be understood that, the performance points may also be assigned to both types of users, namely, the author and the receptor. In one embodiment, the performance points may be assigned to the at least one user (the author and to the receptor) for the activity data being appreciated by at least one other user of the plurality of users on the web-based platform. In other words, the performance points may be awarded to the at least one user based on feedback of the at least one other user on the activity data. In one aspect, the feedback may be in the form of liking the activity data, commenting on the activity data, sharing the activity data, following the at least one user associated with the activity data.

Based on the feedback of the at least one other user, the scoring module 214 may analyze one or more parameters associated to the activity data in order to assign the performance points to the at least one user. Example of the one or more parameters may include, but not limited to, a distance, a speed, a frequency, and a quality.

In one embodiment, the distance may be indicative of a measure of spread of the activity data being posted by the at least one user. In one aspect, the higher the distance between the one or more subjects, higher may be the performance point assigned to the at least one user. In other words, a number of hops from one technology area to another may contribute to the determination of the performance points. It may be understood that, the distance may be calculated in two dimensions in an organization, namely a structural dimension and a geographical dimension.

The structural dimension may consider interactions among various divisions/department in an organization. As the distance among various divisions in the organization, additional points may be assigned for cross-domain, across-Industrial Service Units (ISUs), across-departments and sub-departmental. The geographical dimension, on the other hand, takes into account a geographic distance between the author and the receptor. In one aspect, more is the geographic distance between the author and the receptor, more are the performance points assigned to either the author or the receptor.

Figure 3:
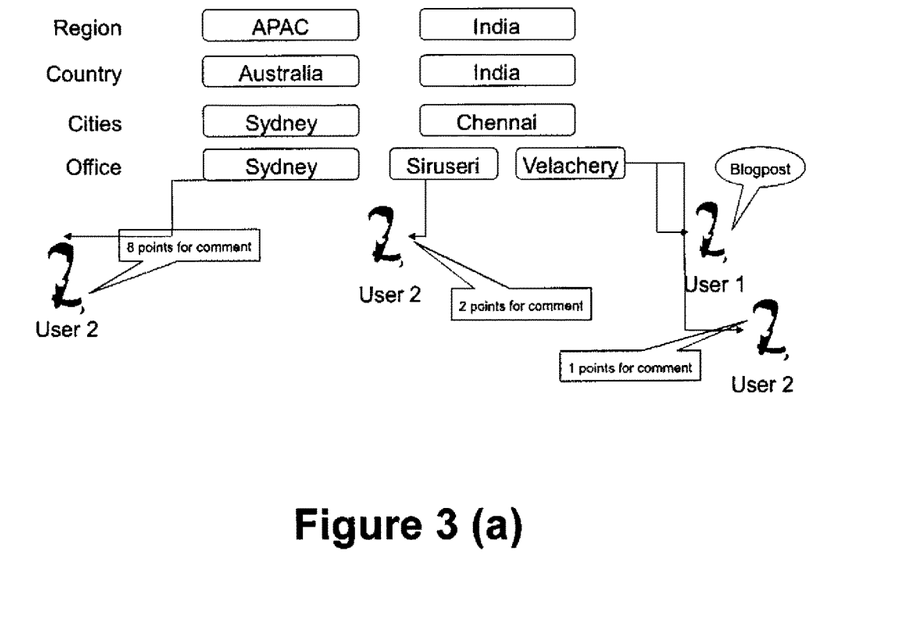
FIGS. 3(a) and 3(b) are working examples of the system, in accordance with one or more embodiments of the present subject matter.

In one example, as shown in FIG. 3(*a*), a User $U_1$ is an author, responsible for creating a blog $B_1$ on the web-based platform. A User $U_2$, in response, performs an activity comprising activity data $A_1$ associated to the blog $B_1$ on the web-based platform from "Velachery". Then, based on the geographic distance, the scoring module 214 may assign "1 performance point" to the User $U_2$ for the $A_1$. In one embodiment, the User $U_2$ may further perform another activity $A_2$ corresponding to the blog $B_1$ from "Siruseri". As the geographic distance between the author and the receptor increases, the User $U_2$ may further be assigned with "2 performance points" for the activity $A_2$. The user $U_2$ may further perform another activity $A_3$ corresponding to the blog $B_1$ from "Sydney". As the geographic distance between the author and the receptor further increases, the User $U_2$ may further be assigned with "8 performance points" for the activity $A_3$. In this manner, the at least one user may be assigned the performance points based on the distance.

A second parameter of the set of parameters contributing to the performance points is speed. In one embodiment, the speed may be limited to interactions relating to Question and their respective Answers on the web-based platform. In one aspect, the performance points pertaining to speed may be assigned to the receptor based on speed at which the receptor responds to the Question on the web-based platform. Consider an example, as illustrated in FIG. 3(b), a User $U_1$, a User $U_2$, and User $U_3$ involved in a discussion on a collaborative platform. The User $U_1$ performs an activity comprising the activity data $A_1$. It may be understood from the example that, the activity data $A_1$ corresponding to the User $U_1$ seeks advice on "best resources available of Ruby on Rail (RoR) beginners" from the at least one other user on the web-based platform. The User $U_2$, and the User $U_3$, in response to the activity data $A_1$, publishes an activity data $A_2$ and activity data $A_3$ respectively on the web-based platform. It may be understood that, the User $U_2$ responded within a minute, while the User $U_3$ responded within few seconds, after the response of the User $U_2$. In one aspect, the User $U_2$ responded that, "Railcasts may be a good starting tool for the beginners that are involved in RoR framework". The User $U_3$, on the other hand, further responded that, "RubyMonk may be a good reference for the beginners that are involved in RoR framework". Based on the response time and the activity data corresponding to the User $U_2$, the User $U_2$ may receive the feedback from the at least one other user on the web-based platform. Since, the User $U_2$ responded earlier than User $U_3$ and further the User $U_2$ also received the feedback, the scoring module 214 may assign more performance points to the User $U_2$ than the User $U_3$.

A third parameter of the set of parameters contributing to the performance points is frequency. The frequency is a way of assigning the performance points to the user based on number of activities being performed by the at least one user. In order to understand concept of the frequency, let us consider the example (2) same as aforementioned, the User $U_2$ may be assigned with more performance points than the User $U_1$, the User $U_3$, and the User $U_4$, because the frequency of the activities being performed by the User $U_2$ is more than the User $U_1$, the User $U_3$, and the User $U_4$. Therefore the User $U_2$ may be assigned with more performance points.

A fourth parameter of the set of parameters contributing to the performance points is quality. The quality may be determined by quantifying feedbacks from the subject matter experts and other receptors involved in the discussion on the subject. The quality may also be determined based upon a number of credentials such as, certifications, diplomas, number of degrees, and qualification of the at least one user, education level (Bachelors, Masters, and Phd) on the subject.

Therefore, based on the feedback and the corresponding one or more parameter (distance, speed, frequency, and quality) associated to the activity data, the performance points may be assigned to the at least one user.

In one embodiment, after assigning the performance points, the subject may also be assigned with subject points. In one aspect, the subject points may be assigned to the subject based on aggregation of the performance points assigned to each user of the at least one user involved in the activity data corresponding to the subject. In one aspect, if a User $U_1$, a User $U_2$, a User $U_3$ and a User $U_4$ are associated to the subject $S_1$, then the subject points of the subject $S_1$ may be determined by:

$$\text{Subject points}_{(S1)} = \Sigma(\text{User } U_{1\ (performance\ points\ in\ S1)}, \text{User } U_{2\ (performance\ points\ in\ S1)}, \text{User } U_{3\ (performance\ points\ in\ S1)}, \text{User } U_{4\ (performance\ points\ in\ S1)}) \quad \text{equation (1)}$$

In order to determine the subject points of the subject, consider an example, a User $U_1$, a User $U_2$, a User $U_3$ and a User $U_n$ are assigned with the performance points 1500, 1000, 2000 and 500 respectively on a subject $S_{(Artificial\ Intelligence)}$. Then based on the equation (1), the subject points of the $S_{(Artificial\ Intelligence)}$ may be determined by:

$$\text{Subject points}_{(Artificial\ Intelligence)} = \Sigma(\text{User } U_{1\ (1500)}, \text{User } U_{2\ (1000)}, \text{User } U_{3\ (2000)}, \text{User } U_{n\ (500)}) \text{ i.e. } 5000 \quad \text{equation (2).}$$

It may be understood that, the $\text{subject}_{(Artificial\ Intelligence)}$ has 4 contributors in total, wherein each with the 4 contributors has contribution shares w.r.t performance points earned from that subject $S_{(Artificial\ Intelligence)}$. It may further be understood that the User $U_1$, the User $U_2$, the User $U_3$ and the User $U_4$ may also contributed in one or more other subjects like Mechanical, Electrical and the like. Then, the performance points of the at least one user i.e. (the User $U_1$, the User $U_2$, the User $U_3$ and the User $U_4$) in the one or more subjects may be determined by:

$$\text{Performance Points of User } U_1 = \Sigma[(U_1(\text{Performance points}_{(Artificial\ Intelligence)}) + (U_1(\text{Performance points}_{(Mechanical)}) + (U_1(\text{Performance points}_{(Electrical)}) + (U1(\text{Performance points}_{(n)})]) \quad \text{equation (3)}$$

Similarly, the performance points of the User $U_2$, the User $U_3$ and the User $U_4$ may also be determined based on the equation (3).

Since, it may be understood from the equation (2) that, the performance points of the User $U_1$, in the subject $S_{(Artificial\ Intelligence)}$ is 1500 and from the equation (1), the subject points of the subject $S_{(Artificial\ Intelligence)}$ is 5000, then contributing proportion of the User $U_1$, in the subject $S_{(Artificial\ Intelligence)}$ may be determined based on the ratio of the subject points of the subject $S_{(Artificial\ Intelligence)}$ and the performance points of the User $U_1$ in the subject $S_{(Artificial\ Intelligence)}$ i.e. 30%. Similarly, in this manner, the contributing proportion of the User $U_2$ (20%), the User $U_3$ (40%) and the User $U_4$ (10%) in the subject $S_{(Artificial\ Intelligence)}$ may be determined. Thus, based on the contributing proportion of the respective user, the User $U_3$ may be determined as the expert of the subject $S_{(Artificial\ Intelligence)}$ amongst the one or more users.

In one embodiment, the scoring module 214 may further verifies the expertise of the at least one user in the subject. The expertise may be verified based on presence of skill set, endorsements, project/work history corresponding to the subject. In one example, if it is determined based on the endorsements and the project/work history that, the User $U_1$ (30%) has a competency in "Machine Learning" whereas the User $U_3$ (40%) didn't have the skill set pertaining to the subject $S_{(Artificial\ Intelligence)}$. Then, based on the aforesaid description, it may be determined that, the User $U_1$ may have higher level of expertise then the User $U_3$ in the subject $S_{(Artificial\ Intelligence)}$.

In order to further determine the level of expertise, the scoring module 214 may generate an activity gauge for the at least one user based on the performance points and the subject points. In one embodiment, the activity gauge may be represented by a scale of low, medium and high wherein the scale indicates a level of expertise of the at least one user in the subject. In one aspect, the level of expertise is low when the performance points are less than a first threshold value whereas the level of expertise is high when the performance points are greater than a second threshold value. Further, the level of expertise is medium when the performance points are between the first threshold value and the second threshold value. In one aspect, the first threshold value and the second threshold value may be defined based on the subject points, wherein the first threshold value and the second threshold value is stored in the database 218. Thus, based on the performance points, the activity gauge may classify the at least one user with different levels of expertise in the subject.

In one example, consider that the first threshold value and the second threshold value may be pre-defined as '5' and '10' respectively in the database 218. Then, if it is determined that the performance points assigned to a User $U_1$ is '3', the scoring module 214 compares the performance points i.e. '3' with the first threshold value i.e. '5' to check whether the performance points are less than the first threshold or not. As the '3' is less than '5', the scoring module classifies the User $U_1$ as the expert who is having a low level of expertise in the subject. Similarly, if it is determined that the performance points for a User U2 is '11', the scoring module 214 compares the performance points i.e. '11' with the first threshold value i.e. '5' to check whether the activity gauge is less than the first threshold. As '11' is greater than '5', the scoring module may further compare the performance points i.e. '11' with the second threshold value i.e. '10'. As '11' is greater than '10', the scoring module classifies the User U2 as the expert who is having a high level of expertise in the subject. Furthermore, if it is determined that the performance points for a User U3 is '7', the scoring module 214 indicates that the User U3 is having a medium level of expertise in the subject.

Exemplary embodiments discussed above may provide certain advantages. Though not required to practice aspects of the disclosure, these advantages may include those provided by the following features.

Some embodiments enable a system and a method to identify an expert from one or more users based on their activities performed on the web-based platform.

Some embodiments enable to identify a subject matter expert (SME) and thereby assisting Human Resource (HR) manager to assemble better teams for projects by understanding respective skill set of each user.

Figure 4:
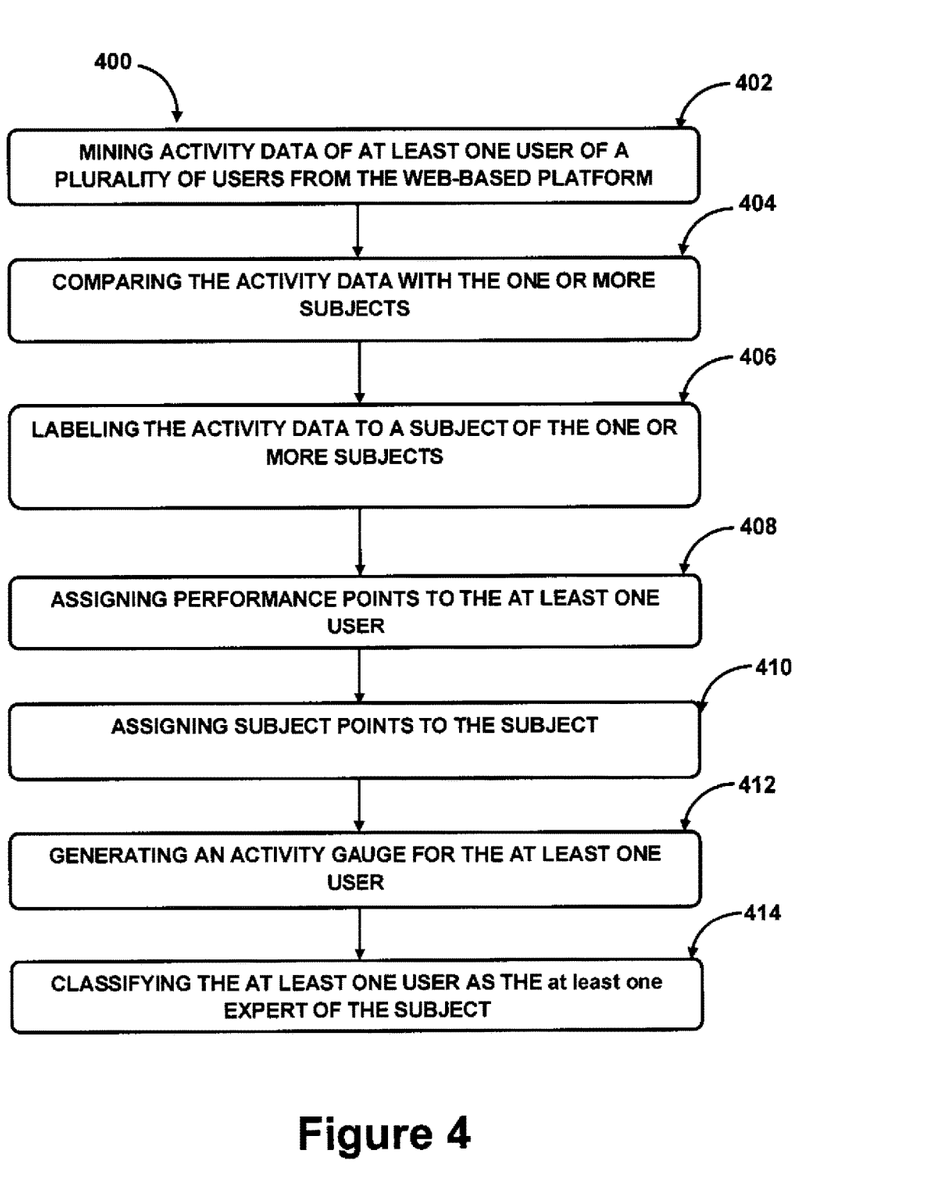
FIG. 4 illustrates a method for determining the expert of the one or more subjects on the web-based platform, in accordance with an embodiment of the present subject matter.

Referring now to FIG. 4, a method 400 for determining an expert of one or more subjects on a web-based platform is shown, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof However, for ease of explanation, in the embodiments described below, the method 300 may be considered to be implemented as described in the system 102.

At block 402, activity data of at least one user of a plurality of users from the web-based platform may be mined. In one implementation, the activity data may be mined by the mining module 212.

At block 404, the activity data may be compared with one or more subjects using one or more techniques. In one implementation, the activity data may be compared with one or more subjects by the mining module 212.

At block 406, the activity data may be labeled to a subject of the one or more subjects. In one implementation, the activity data may be labeled by the mining module 212.

At block 408, performance points may be assigned to the at least one user, wherein the at least one user is associated to the activity data. In one implementation, the performance points may be assigned by the scoring module 214.

At block 410, subject points may be assigned to the subject based on the performance points assigned to the at least one user. The subject points indicates aggregation of the performance points assigned to each user of the at least one user in the subject. In one implementation, the subject points may be assigned by the scoring module 214.

At block 412, an activity gauge for the at least one user may be generated based on the performance points and the subject points. In one aspect, the activity gauge may indicate a level of expertise of the at least one user in the subject. In one implementation, the activity gauge for the at least one user may be generated by the scoring module 214.

At block 414, the at least one user may be classified as the expert of the subject. In one implementation, the at least one user as the expert of the subject may be classified by the scoring module 214.

Although implementations for methods and systems for determining the expert of the one or more subjects on the web-based platform have been described in language specific to structural features and/or methods, it is to be understood that the appended claims are not necessarily limited to the specific features or methods described. Rather, the specific features and methods are disclosed as examples of implementations for determining the expert of the one or more subjects.

We claim:

1. A method for mining activity data of a user on a web based platform to measure and quantify activities of the user on the web based platform, the method comprising:

mining, by a processor, activity data associated with activities of at least one user of a plurality of users from the web-based platform for measuring knowledge sharing by the at least one user on the web based platform, by way of enhanced capturing of activities of the user on the web based platform, wherein the activity data is mined by using various data mining techniques to execute a set of tasks comprising anomaly detection, association rule learning, clustering, classification, regression and summarization, wherein the activities comprise sharing knowledge, instant messaging, posting messages, posting a blog, commenting expressions, expressing feelings, writing a blog, comment, answer, question, status update, or a combination thereof;

labeling, by the processor, the activity data to a subject of one or more subjects based upon comparison of content of the activity data with the one or more subjects using at least one technique, wherein labeling of the activity data to the subject indicates that the activity data is contextually related to the subject;

assigning, by the processor, performance points to the at least one user associated with the activity data labeled to the subject based upon a plurality of parameters and feedback associated with the activity data, wherein the performance points are assigned to the at least one user for being an author and/or a receptor, wherein the author is a person who starts the activity and the receptor is a person who provides feedback to the activity or clarifies on the activity, wherein the feedback is received from other users in the form of at least one of like, comment, share, follow or favorite, and the plurality of parameters comprises a distance, speed, frequency and quality, wherein the distance is indicative of a measure of spread of the activity data being posted by the user, and wherein the speed is response time of the at least one user during the activity, and frequency is indicative of a count of the activity data being performed by the at least one user on the web-based platform, and the quality is determined by quantifying feedbacks from subject matter expert and receptors involved in a discussion on at least one subject, wherein higher the distance between the subjects, higher the performance point are assigned to the user and a number of hops from one technology area to another technology associated with the subjects contributes to capturing the performance of the at least one user across diverse technologies, and wherein the distance is calculated in two dimensions in an organization, namely a structural dimension and a geographical dimension, wherein the structural dimension accounts interactions among various departments or divisions in the organization, and the geographical dimension accounts a geographic distance between the author and the receptor enables capturing the activities of the user across different geographies and different departments, wherein higher performance points are assigned based on the distance among various divisions in the organization, cross-domain, across-Industrial Service Units (ISUs), across-departments and sub-departmental, and wherein the quality indicates a plurality of credentials associated to the user, and wherein the plurality of credentials comprises certifications, diplomas, number of degrees, and qualification of the user;

assigning, by the processor, subject points to the subject based on the performance points assigned to the at least one user, wherein the subject points of the subject indicates aggregation of the performance points assigned to each user of the at least one user in the subject thereby the performance points and the subject points accurately quantify the activity data of the user on the web based platform.

2. The method of claim 1 further comprises assigning subject points to the subject based on the performance points assigned to the at least one user, wherein the subject points of the subject indicates aggregation of the performance points assigned to each user of the at least one user in the subject, wherein the one or more subjects comprise Mechanical, Electrical, Electronics and telecommunication, Computers, Information Technology, and Civil, mobile phones, home appliances, fashion, Light Emitting Diode (LED) Televisions, and Artificial Intelligence.

3. The method of claim 1, wherein the at least one user is at least one of an author or a receptor.

4. The method of claim 1, wherein the quality also indicates a plurality of credentials associated to the at least one user, and wherein the plurality of credentials comprises certifications, diplomas, number of degrees, and qualification of the at least one user.

5. The method of claim 1, wherein the web-based platform is at least one of an e-learning management platform, a human resource management platform, a social platform, and alike.

6. The method of claim 1, further comprising assigning base points to the at least one user for involving into the at least one activity on the web based platform and wherein the base points vary based upon a complexity, a type and importance of the activity performed by the at least one user, wherein the base points are represented on a scale to the at least one user, and wherein the scale indicates a measure of activities being performed by the at least one user over a pre-defined time interval.

7. The method of claim 1, wherein the level of expertise is low when the performance points are less than a first threshold value, and wherein the level of expertise is high when the performance points are greater than a second threshold value, and wherein the level of expertise is medium when the performance points are between the first threshold value and the second threshold value.

8. The method of claim 1 further comprises assigning the performance points to the user for getting appreciation for the activity data by one or more other users on the web based platform.

9. A system for mining activity data of a user a web based platform by capturing of activities of the user on the web based platform to measure and quantify the activities of the user on the web based platform, the system comprising:
   a processor; and
   a memory coupled to the processor, wherein the processor is capable of executing a plurality of modules stored in the memory, and wherein the plurality of module comprising:
   a mining module configured to:
      mine activity data associated with activities of at least one user of a plurality of users from the web-based platform for measuring knowledge sharing by the at least one user on the web based platform, by way of enhanced capturing of activities of the user on the web based platform, wherein the activity data is mined by using various data mining techniques to execute a set of tasks comprising anomaly detection, association rule learning, clustering, classification, regression and summarization, wherein the activities comprise sharing knowledge, instant messaging, posting messages, posting a blog, commenting expressions, expressing feelings, writing a blog, comment, answer, question, status update, or a combination thereof;
      label the activity data to a subject of one or more subjects based upon comparison of content of the activity data with the one or more subjects using at least one technique, wherein labeling of the activity data to the subject indicates that the activity data is contextually related to the subject; and a scoring module configured to:
assign performance points to the at least one user associated to the activity data labeled to the subject, wherein the performance points are assigned based upon a plurality of parameters and feedback associated with the activity data, wherein the performance points are assigned to the at least one user for being an author and/or a receptor, wherein the author is a person who starts the activity and the receptor is a person who provides feedback to the activity or clarifies on the activity, wherein the feedback is received from at least one other user in the form of at least one of like, comment, share, follow or favorite, and the plurality of parameters comprises a distance, speed, frequency and quality, wherein the distance is indicative of a measure of spread of the activity data being posted by the at least one user, and wherein the speed is response time of the at least one user during the activity, and frequency is indicative of a count of the activity data being performed by the at least one user on the web-based platform, and the quality is determined by quantifying feedbacks from subject matter expert and receptors involved in a discussion on at least one subject, wherein higher the distance between the subjects, higher performance points are assigned to the user and a number of hops from one technology area to another technology associated with the subjects contributes to capturing the performance of the at least one user across diverse technologies, and wherein the distance is calculated in two dimensions in an organization, namely a structural dimension and a geographical dimension, wherein the structural dimension accounts interactions among various departments or divisions in the organization, and the geographical dimension accounts a geographic distance between the author and the receptor enables capturing the activities of the user across different geographies and different departments, wherein higher performance points are assigned based on the distance among various divisions in the organization, cross-domain, across-Industrial Service Units (ISUs), across-departments and sub-departmental, and wherein the quality indicates a plurality of credentials associated to the user, thereby the performance points accurately quantify the activity data of the user on the web based platform.

10. The system of claim 9, further comprising assigning base points to the at least one user for involving into the at least one activity on the web based platform and wherein the base points vary based upon a complexity, a type and an importance of the activity performed by the at least one user on the web based platform, and wherein the base points are represented on a scale to the at least one user, and wherein the scale indicates a measure of activities being performed by the at least one user over a pre-defined time interval.

11. The system of claim 9, further comprises assigning subject points to the subject based on the performance points assigned to the at least one user, wherein the subject points of the subject indicates aggregation of the performance points assigned to each user of the at least one user in the subject, wherein the one or more subjects comprise Mechanical, Electrical, Electronics and telecommunication, Computers, Information Technology, and Civil, mobile phones, home appliances, fashion, Light Emitting Diode (LED) Televisions, and Artificial Intelligence.

12. A non-transitory computer program product having embodied thereon a computer program for executing a method for mining activity data of a user on a web based platform to measure and quantify activities of the user on the web based platform, the computer program product storing instructions executed by a processor, the instructions comprising the instructions for:

mining activity data associated with activities of at least one user of a plurality of users from the web-based platform for measuring knowledge sharing by the at least one user on the web based platform, by way of enhanced capturing of activities of the user on the web based platform, wherein the activity data is mined by using various data mining techniques to execute a set of tasks comprising anomaly detection, association rule learning, clustering, classification, regression and summarization, wherein the activities comprise sharing knowledge, instant messaging, posting messages, posting a blog, commenting expressions, expressing feelings, writing a blog, comment, answer, question, status update, or a combination thereof;

labeling the activity data to a subject of one or more subjects based upon comparison of content of the activity data with the one or more subjects using at least one technique, wherein labeling of the activity data to the subject indicates that the activity data is contextually related to the subject; and assigning performance points to the at least one user associated with the activity data labeled to the subject based upon a plurality of parameters and feedback associated with the activity data, wherein the performance points are assigned to the at least one user for being an author and/or a receptor, wherein the author is a person who starts the activity and the receptor is a person who provides feedback to the activity or clarifies on the activity, wherein the feedback is received from other users in the form of at least one of like, comment, share, follow or favorite, and the plurality of parameters comprises a distance, speed, frequency and quality, wherein the distance is indicative of a measure of spread of the activity data being posted by the at least one user, and wherein the speed is response time of the at least one user during the activity, and frequency is indicative of a count of the activity data being performed by the at least one user on the web-based platform, and the quality is determined by quantifying feedbacks from subject matter expert and receptors involved in a discussion on at least one subject, wherein higher the distance between the subjects, higher the performance point are assigned to the user and a number of hops from one technology area to another technology associated with the subjects contributes to capturing the performance of the at least one user across diverse technologies, and wherein the distance is calculated in two dimensions in an organization, namely a structural dimension and a geographical dimension, wherein the structural dimension accounts interactions among various departments or divisions in the organization, and the geographical dimension accounts a geographic distance between the author and the receptor enables capturing the activities of the user across different geographies and different departments, wherein higher performance points are assigned based on the distance among various divisions in the organization, cross-domain, across-Industrial Service Units (ISUs), across-departments and sub-departmental, and wherein the quality indicates a plurality of credentials associated to the user, thereby the performance points accurately quantify the activity data of the user on the web based platform.

\* \* \* \* \*